March 19, 1968 C. G. DEWEY 3,374,399
DISTANCE PROTECTIVE RELAYING
Filed Feb. 1, 1966 3 Sheets-Sheet 3
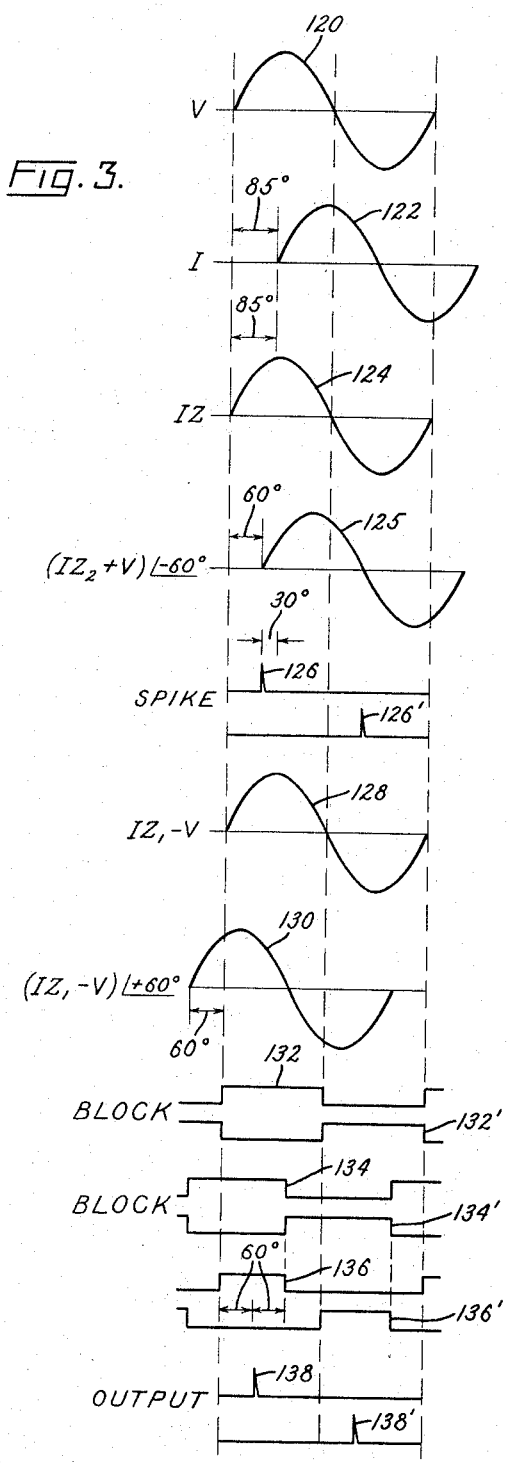
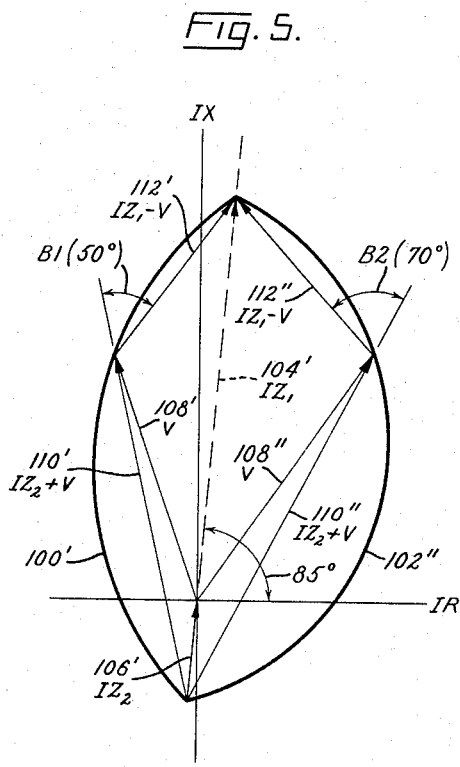

3,374,399
DISTANCE PROTECTIVE RELAYING
Clyde G. Dewey, Drexel Hill, Pa., assignor to General
Electric Company, a corporation of New York
Filed Feb. 1, 1966, Ser. No. 524,198
19 Claims. (Cl. 317—36)

This invention relates to distance relays for protecting electric power transmission lines, and more particularly to high-speed distance relays of the static type having special operating characteristics.

Distance relays are used in the art of protective relaying to perform predetermined control functions, such as to detect faults and to supervise the opening of a high-voltage circuit interrupter to isolate a protected line section of an A-C electric power system, whenever the relationship between line voltage (V) and line current (I) at the relay location is indicative of a short circuit or fault condition on the protected line. The operating characteristic of such a relay is conventionally expressed in terms of the ratio of line voltage to line current, or in other words the apparent impedance of the power system, which is used to operate the relay. The actual impedance of the protected line per unit length has a determinable value, and apparent impedance during the fault condition is a measure of the length of the line between the relay and fault locations. Therefore, such a relay is known as a distance relay. The distance relay is operatively responsive to the incidence of any fault so located on the line that the impedance to the fault falls within the predetermined operating range (ohmic reach) of the relay.

The are several known techniques for designing very fast operating distance relays having no moving parts. For example, such relays are disclosed in reissue patent, Re. 23,430, Warrington, originally granted on June 13, 1950, and in Patent No. 2,879,454 granted to M. E. Hodges et al. on Mar. 24, 1959, and in copending application S.N. 256,955, filed Feb. 7, 1963, by J. E. Waldron (now Patent 3,277,345). Some of these prior art static designs have been arranged to have the operating characterisic of the well known mho type distance relay. In obtaining a mho characteristic, it is common to supply a reference voltage, dependent on transmission line voltage, and an operating voltage, comprising the vector combination of two component voltages derived respectively from line voltage and current, to static circuit means appropriately designed to "operate" whenever the relationship between the line-voltage and the line-current derived voltages is indicative of a fault on the line being protected.

In certain protective systems, it is desirable that such protective relays be highly selective, that is, be designed to respond to fault conditions occurring along the transmission line and at the same time to be non-responsive to various conditions that do not represent a fault. In one situation that arises, the maximum reach of the impedance characteristic of the relay should be sufficient to encompass the impedance of the protected line section and to encompass the arcing impedance that may occur during a fault, but not to be responsive to normal operating conditions represented by smaller impedance values but at somewhat different angles from that of the maximum reach along the transmission line itself. The line impedance during the fault has a large reactive component, while the arcing impedance is essentially resistive. Accordingly, a desirable impedance characteristic for such a relay is a narrow-waisted or elliptical one when represented on an R–X diagram, with the long axis along the maximum reach of the line and the short axis sufficiently large to encompass the arcing resistance. A distance relay having such a narrow characteristic is well suited for phase-fault relaying for longer transmission lines that are heavily loaded and is less likely to be affected by abnormal line conditions other than such line faults. One use for such a relay is in high-capacity, extra-high-voltage transmission of blocks of power of the order of 1000 and more megawatts by way of series-capacitor compensated lines, and with very high speed operation in a phase-comparison pilot relaying system.

Accordingly, it is an object of this invention to provide a new and improved static relaying system.

Another object is to provide a new and improved static distance relay having a non-circular operating characteristic.

Another object is to provide a new and improved static distance relay having a dual mho operating characteristic and responsive to faults along the transmission line and non-responsive to normal operating conditions within the same impedance range of the maximum reach of the relay but at different angles.

Another object is to provide a new and improved static distance relay that has a quasi-elliptical operating characteristic and that operates at high speed.

In carrying out this invention in one form for protecting an A-C power transmission line, a static distance relay of the offset mho type is provided having a quasi-elliptical operating characteristic. The relay employs line-voltage responsive means to develop reference voltages V proportional to the line voltages and in phase therewith. Also employed are line-current responsive means including a transactor to develop representative voltages related to the line currents I by predetermined impedances $Z_1$ and $Z_2$, which respectively correspond to the forward and backward reach of the relay. Means are provided to combine these voltages in various ways to develop polarizing voltages proportional to the vectors $IZ_2+V$, and two sets of operating voltages proportional to $IZ_1-V$, where the two sets have a relative phase displacement. The combining means include phase shift means for producing the required phase shifts. These combined voltages are supplied to static circuit means which produces an output control signal whenever predetermined relationships exist between these voltages that is indicative of a fault condition on the protected line. These relationships include the relative magnitudes of $IZ_1$ and V of both operating voltages at a time determined by the polarizing voltage.

In one aspect of this invention, a "block-block-spike" mechanism is employed to detect the aforementioned voltage relationships. A static circuit means is used to develop a spike from the polarizing voltage, and to develop blocks from the operating voltages. Upon coincidence of the blocks and spike, an output control signal is generated indicating the detection of a fault within the relay characteristic. This characteristic, in the illustrated form of the invention, assumes a quasi-elliptical shape of impedance diagram. The phase relation of each block with the spike determines a circular impedance diagram, and the restriction of generating the output signal only upon coincidence of the two blocks determines the characteristic of the area of overlap of the two circular diagrams. The narrow characteristic has its long axis along the angle of maximum reach which bears a fixed ratio to the impedance of the protected line. By providing the backward reach, the resulting characteristic is offset and thereby adequately encompasses the arc resistance under fault conditions. The long, narrow overall characteristic restricts the relay operation to faults at the angle of the protected line, so that the relay is specially suited to the protection of long power lines.

In an aspect of this invention, a transistor circuit is provided for the static circuit means, which functions to develop additional voltages from the aforementioned combined voltages and to compare the relations of these voltages on the basis of "block-block-spike." In an illustrated from of the invention, a voltage spike is generated at a certain time during each cycle of the polarizing voltage. The transistor circuit also generates voltage blocks corresponding to each half cycle of duration of the operating voltages; and these voltage blocks are combined to develop an effective resultant block coresponding to the coincidence of the two blocks. The output signal is produced only when the spike occurs in the time interval corresponding to the resultant voltage block.

The foregoing and other objects of this invention, the features thereof, as well as the invention itself, may be more fully understood from the following description when read together with the accompanying drawing, in which:

FIG. 3 is an idealized graphical diagram of the phase relations of waveforms occurring in various parts of the circuit of FIG. 1 under certain conditions;

FIG. 5 is an idealized graphical diagram similar to FIG. 2 illustrating a modified form of characteristic of a relay embodying this invention.

Corresponding parts are referenced throughout the drawing by similar characters.

Figure 1:
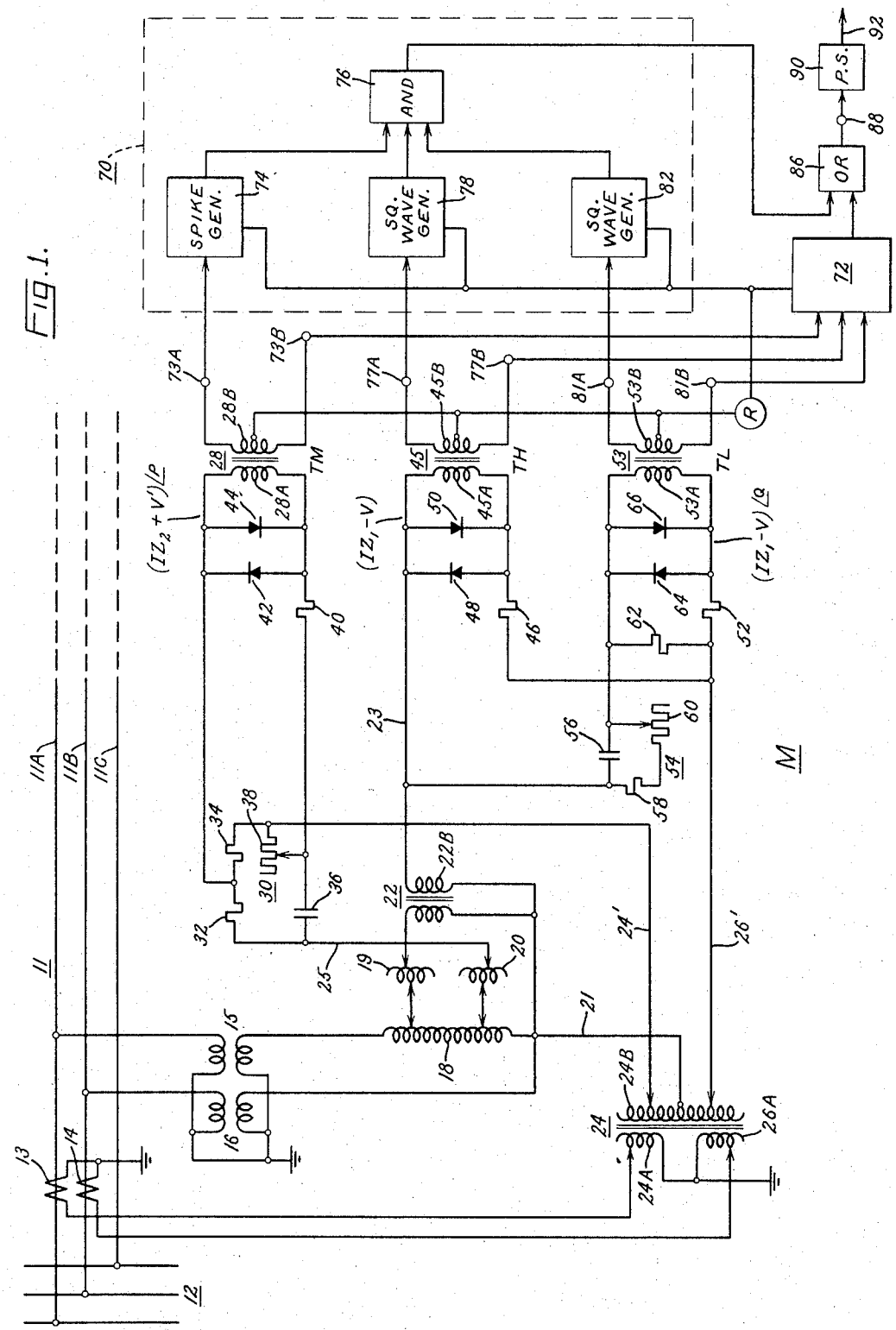
FIG. 1 is a schematic circuit and block diagram of a static distance relay embodying this invention.

In the diagram of FIG. 1, a 3-phase alternating-current (A-C) electric power transmission line is made up of conductors 11A, 11B and 11C, which represent a section of a high-voltage electric power system used for conducting alternating current of a power frequency such as 60 cycles per second from a terminal represented at the section of the line 11 illustrated in FIG. 1 to utilization or load circuits connected to a distantly located terminal of the protected line 11. The transmission line 11 is connected at the illustrated terminal to the power source bus 12 by means of a 3-pole circuit interrupter (not shown for simplicity of illustration) of appropriate design. A distance relay M is coupled to the line 11 together with other protective equipment (not shown for simplicity of illustration). One type of protective system in which the relay of the present invention may be used is a phase-comparison pilot relaying system such as that described in McConnell Patent U.S. 2,834,921 to perform non-directional starting (i.e., blocking) or trip supervision, the description of which is herein incorporated for purposes of illustrating one complete system in which the distance relay M may be used; and another is a directional comparison pilot relaying system such as that described in the aforementioned U.S. Patent 2,879,454. The relay M may be used for various control functions such as that of providing a blocking signal or a tripping signal in a directional comparison pilot relaying system in response to the occurrence of a phase fault on the protected line, that is, upon the occurrence of a short circuit between two of the phase conductors that make up the line 11.

The relay M is coupled to the transmission line 11 at the local terminal by means of a pair of Y-connected instrument current transformers 13 and 14 respectively associated with conductors 11A and 11B, and by a pair of Y-connected instrument potential transformers 15 and 16 which are respectively coupled to the same two conductors. The secondary currents of the current transformers 13 and 14 are individually representative phase conductors 11A and 11B, and the combined voltage derived across the secondary windings of the potential transformers 15 and 16 is proportional to the line-to-line voltage between these conductors. The relay M is arranged to operate in response to certain relationships between the representative voltage and currents arising upon the occurrence of a fault that involves both of the phase conductors 11A and 11B of the protected transmission line. Response to phase-to-phase faults involving conductors 11B and 11C or conductors 11C and 11A is obtained in practice by providing additional current and potential transformers coupled to the conductor 11C and by providing two or more duplicate relays similarly connected thereto in a manner well known in the art and as described in the aforementioned U.S. Patent 2,879,454.

Connected across the secondaries of the potential transformers 15 and 16 is an autotransformer with a main winding 18 and extending windings 19 and 20 connected by taps to the main winding 18; one terminal of winding 18 is connected to a common line 21. The primary 22A of a step down transformer 22 is connected between a tap of winding 19 and the common line 21. The voltage V developed across the secondary 22B between lines 23 and 21 is representative of the voltage between the lines 11A and 11B and is used to define the forward reach of the relay characteristic. The tap on the supplementary winding 20 of the autotransformer provides a voltage V' between lines 25 and 21 representative of the voltage between the lines 11A and 11B without the step down factor.

The secondary of the current transformer 13 is connected to a terminal of a first primary 24A of a transactor 24, which functions in effect as an air-gap reactor having primary and secondary windings and with a load circuit connected to the secondary winding 24B. Similarly, the secondary of the current transformer 14 is connected to a second primary 26A of transactor 24; the other terminals of the transactor primaries are connected to ground, and the primaries are connected in opposite polarities. The secondary 24B of the transactor 24 has one terminal connected to the common line 21. The voltage developed across the secondary winding 24B of the transactor is representative, both in magnitude and phase, of the net A.C. current flowing in its primary windings. Thus, with the primaries connected effectively in opposite polarities, the secondary voltage represents the vector difference between the currents in lines 11A and 11B. Secondary voltage of the transactor is related to primary current by a complex proportionality constant or vector operator known as the transfer impedance Z of the transactor; thus, the secondary voltage is IZ. Open circuit secondary voltage leads primary current by nearly 90 electrical degrees, and as the resistive load across the secondary is increased, the angle of lead becomes less. The resistive loading of the secondary circuits is chosen to provide a phase shift in the secondary voltage (relative to the line current) corresponding to the desired power factor angle (i.e., the angle by which line current lags line voltage) of maximum reach of the relay, which in an illustrative embodiment (FIG. 2) is approximately 85 to 88°. A first adjustable tap of the secondary 24B is set to provide an output voltage between lines 24' and 21 that is proportional to the vector $IZ_2$, where impedance vector factor $Z_2$ corresponds to the backward reach of the relay. A second adjustable tap of the transactor secondary 24B is adjusted to supply a voltage between lines 26' and 21 proportional to the vector $IZ_1$, where impedance vector factor $Z_1$ corresponds to the forward reach of the relay. Since the transformer 22 provides a 4:1 ratio of V to V', a maximum forward reach $Z_1$ that is four times greater than $Z_2$ is obtained with a selection of $Z_1$ equal to $Z_2$ at the transaction 24; hereinafter, for the sake of clarity it is assumed that V equals V', and $Z_1$ equals $4Z_2$.

The aforementioned voltages representative of line voltage and line current are combined and applied across the primary windings of three transformers TM, TH and TL. The connection to the primary 28A to TM transformer 28 from V' line 25 is via a phase-shifter network 30, which includes a series capacitor 36 which connects line 25, via a load resistor 40, to one terminal of primary 28A, and which also includes three resistors 32, 34 and 38 connected across the capacitor 36. The junction of resistors 32 and 34 is connected to the other terminal of the primary 28A, and $IZ_2$ line 24' is connected to the junction of resistor 34 and variable resistor 38. The latter's setting determines the phase-shift angle P, which in the illustrative embodiment (FIG. 2) is 60°, and the combined voltage applied via network 30 to TM primary is the vector sum $(IZ_2+V') \angle P$. Also connected across the TM primary 28A are two voltage regulating diodes 42 and 44 in parallel and oppositely poled to function as diode clippers to limit the voltages applied across the transformer primary, which ensure the application of appropriate voltage amplitudes to electronic circuits in the secondary circuit.

The V line 23 is connected to one terminal of the primary 45A of the TH transformer 45, the other terminal of which is connected via a load resistor 46 to the $IZ_1$ line 26'. A pair of oppositely-poled clipping diodes 48 and 50 are connected in parallel across the TH primary 45A. The component voltages are applied in opposition to primary 45A, and the combined voltage developed across that primary is proportional to the vector difference between $IZ_1$ and the phase-to-phase voltage V, that is $IZ_1-V$.

The $IZ_1$ line 26' is also connected via a load resistor 52 to one terminal of the primary 53A of TL transformer 53, the other terminal of which is connected to the V line 23 via a phase-shifter network formed as the parallel combination of a capacitor 56 and a variable-resistance combination formed of a fixed resistor 58 and a variable resistor 60. A resistor 62 is connected across the series combination of resistor 52 and the primary 53A. A pair of oppositely-poled clipping diodes 64 and 66 are connected in parallel across the primary of transformer TL. The setting of the tap of resistor 60 in the phase-shifter network determines the phase-shift angle Q of the voltage applied across the TL primary 53A. The voltage applied across that primary is proportional to the vector difference between $IZ_1$ and the reference voltage V representative of the phase-to-phase line voltage $(IZ_1-V) \angle Q$, and for the illustrated embodiment the phase shift of that combined voltage is 60°.

The secondaries of the transformers TM, TH, and TL have intermediate taps connected to a direct voltage source (such as a battery), which provides a direct reference voltage level for the voltages developed at those secondaries. The phase relationships of the voltages at the primaries are maintained at the secondaries. Corresponding terminals of the secondaries of transformers TM, TH, and TL are connected as inputs to a static signal-combining and phase-comparison circuit 70, and the other corresponding terminals of those secondaries are connected as inputs to another static signal-combining and phase-comparison circuit 72, which is similar in construction to circuit 70; only the latter is described in detail hereinafter.

Figure 4:
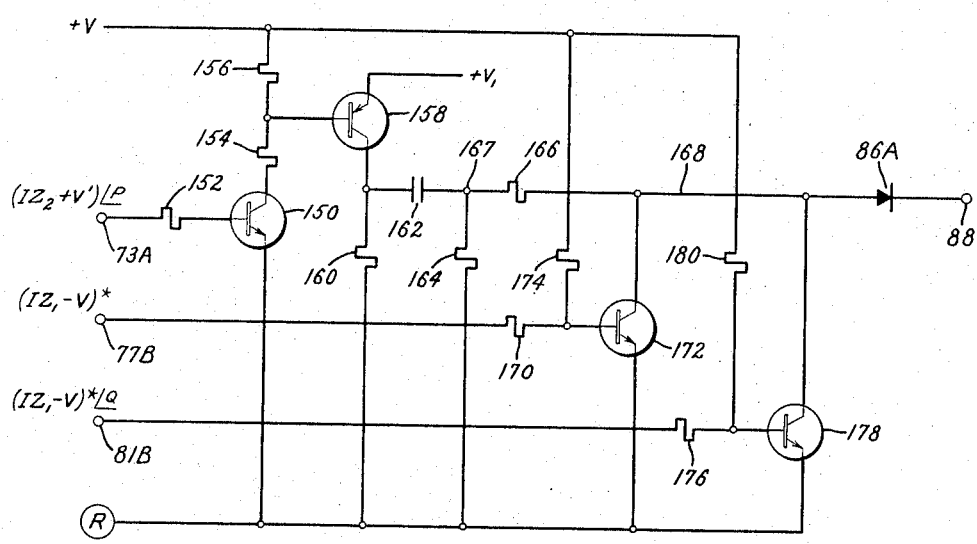
FIG. 4 is a schematic circuit diagram of an electronic circuit that may be used in a portion of the relay of FIG. 1 that is repersented by a block.

In circuit 70, a spike generator 74 receives the polarizing voltage from terminal 73A of the TM secondary 28B and generates a spike or pulse which is applied as an enabling signal to AND circuit 76. The spike generator 74 is activated when the voltage at terminal 73A of the TM secondary crosses over in a positive-going direction with respect to the reference voltage R. A square-wave generator 78 receives one of the operating voltages from terminal 77A of the TH secondary 45B and generates a square-wave signal when that secondary voltage is positive with respect to the reference voltage R; the output square-wave or voltage block of generator 78 is supplied as an enabling input to AND circuit 76. A second square-wave generator 82 receives the other operating voltage from terminal 81A of the TL secondary 55B and generates a square-wave when the secondary output is positive with respect to the reference voltage R, which square-wav is supplied as an enabling input to AND circuit 76. AND gate 76 may take various circuit forms such as a conventional diode or transistor AND gate; a preferred electronic circuit for unit 70 is shown in FIG. 4 and described below. Whatever circuitry is used, AND gate 76 is enabled, or opened, when it receives square waves from both generators 78 and 82, and it passes any spike from generator 74 that is produced during that time. Thus, the output of phase-comparison circuit 70 is a spike, which may occur during alternate half cycles of the input signal and, similarly, the output of circuit 72 is also a spike that may occur during the other alternate half cycles of the input signals. The spike outputs of the circuits 70 and 72 are combined in a logical OR circuit 86, which may take the form of a pair of diodes whose anodes receive the respective pulses from circuits 70 and 72, and whose cathodes are connected together to provide a common output terminal 88. The terminal 88 is connected to a pulse-stretcher circuit 90 that converts each output spike to a square wave on the output line 92, which square wave lasts for the order of 9 milliseconds corresponding to slightly greater than a half cycle of the transmitted power. Thereby, successive spikes from circuits 70 and 72 during alternate half cycles generate a continuous voltage on output line 92, which represents the detection of a line fault condition within the reach of the relay.

Figure 2:
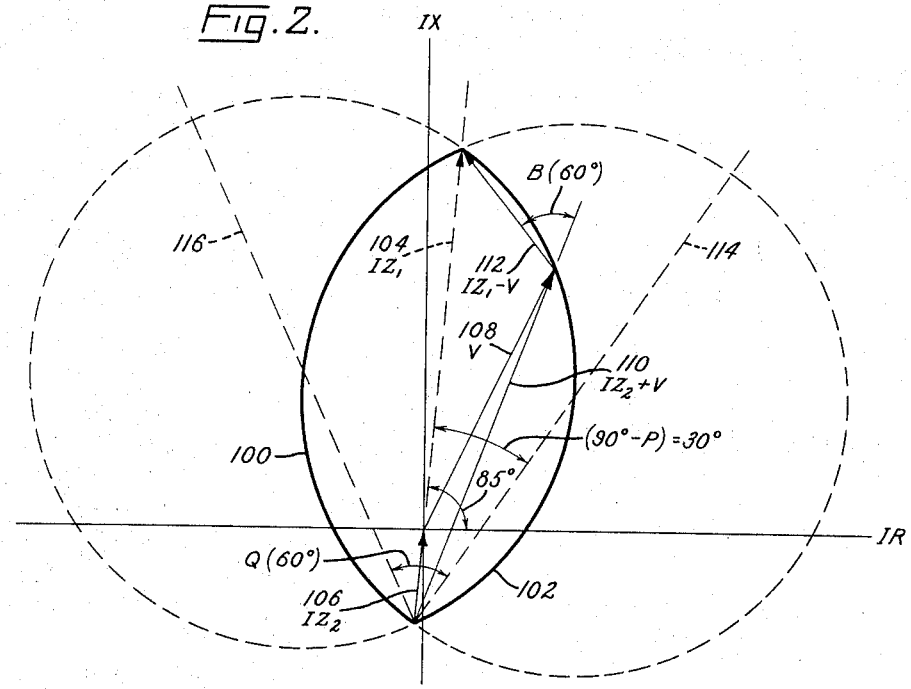
FIG. 2 is an idealized graphical diagram of the operating characteristic of the relay of FIG. 1 presented in terms of voltages representative of the reactive and resistive impedance components.

The overall operation of the relay of FIG. 1 is described with reference to FIG. 2, which shows an idealized voltage or IR–IX diagram (the shape of which is the same as the equivalent impedance or R–X diagram) of the operating characteristic of the relay, and to FIG. 3, which presents a simplified and idealized diagram of the phase relationships of waveforms occurring in different parts of the relay system of FIG. 1 under one fault condition. In FIG. 2, the origin represents the terminal of FIG. 1, that is, the point in the electric power line where the current and potential transformers that supply line voltage and line current to the relay are coupled thereto. The abscissa IR and the ordinate IX respectively represent values of voltages proportional to resistance and inductive reactance of the line, and correspond to the vector relationships between the derived line voltages and currents. The intersecting circular segments 100 and 102 represent the loci of apparent impedance values that define the steady state or static operating range of the relay M. Any phase fault on the protected line of such a nature that the impedance from the terminal to the fault falls within the area circumscribed by the segments 100 and 102 is within the operating range (ohmic reach) of the relay. The broken vector line 104 from the origin extends at the angle of maximum reach of the relay, which by way of illustration is shown as approximately 85°. This vector 104 represents the forward reach of the relay and corresponds to the voltage $IZ_1$. A continuation of this line 104 in the reverse direction is vector 106 that represents the offset or backward reach of the relay; this vector corresponds to the voltage $IZ_2$. The vector 108 is shown as the voltage V, which in the relay represents the system voltage under fault; and vector 110 is the sum of vectors 106 and 108 representing the voltage combination of $IZ_2+V$. The vector 112 represents the vector difference of vectors 104 and 108 corresponding to the voltage combination $IZ_1-V$, and the angle between vectors 110 and 112 is an angle B; this angle is 60° for the condition illustrated by the vectors in FIG. 2 of a fault lying on either one of the two circular segments 100 and 102, and it is less than 60° for any other internal fault and greater than 60° for an external fault. The line 114 is the diameter of the circle (shown in broken lines) of which segment 100 is a part, and it extends from the end of the backward reach 106 making an angle of 30° (for the illustrated embodiment) therewith. Similarly, line 116 is the diameter of the circle of segment 102 and it likewise intersects at an angle of 30° with backward reach 106. The vectors 104 and 106 form a chord common to both circles. The quasi-elliptical characteristic formed by circular segments 100 and 102 can be considered to be derived from two intersecting impedance circles that are formed by rotating the diameters in a lagging and leading direction, respectively, from the angle of maximum reach, and about an axis at the end of the offset reach.

In FIG. 1, the transfer impedance of transactor 26 (i.e. the ratio of the secondary voltage to the primary current thereof) provides the quantity $Z_1$; and the transfer impedance of transactor 24 provides the quantity $Z_2$; the secondary voltages in transactor 24 lead the primary currents thereof by approximately 85 to 88°, which angle is determined by the turns ratio and the dimensions of the air gap of the transactor and defines the maximum reach angle of the relay indicated by lines 104 and 106 in FIG. 2. The adjustments of the taps on the transactor secondary 24B provide individual adjustments of the backward reach 106 and the forward reach 104 of the relay, and establish those parameters of the relay characteristic. Correspondingly, individual adjustments are provided on the autotransformer windings 20 and 19, respectively, for developing the representative voltage V to be combined with the backward reach representative of voltage $IZ_2$ and the forward reach representative of voltage $IZ_1$. These separate adjustments of V permit the setting of the reach more accurately.

The phase-shifter circuit 30 determines the time within each half cycle of the A-C polarizing voltage at which the spike is generated. The spike generator 74 is constructed to generate the spike at the start of each half cycle of the polarizing voltage; therefore, by phase shifting that voltage any leading angle up to 90°, the time of the spike can be retarded up to the maximum voltage point in the half cycle. In the illustrated embodiment, the phase-shift setting of circuit 30 is 60°, which results in the spike being generated in effect at 30° prior to the peak of the unshifted polarizing voltage. In terms of the impedance diagram of FIG. 2, the supplement of this phase-shift angle P corresponds to the angle between maximum reach vector 104 and diameter 114; the phase-shift can be construed as producing a rotation of the diameter through a 30° angle lagging from the position of the maximum reach. From the length and angle of reach lines 104 and 106, and the angle of diameter 114, circular segment 100 is established and defined.

Phase-shifter circuit 54 determines the angle of the diameter 116 of segment 102 (with respect to diameter 114) by producing a leading phase-shift of the operating voltage against which the phase of the spike is ultimately compared. This phase-shift of 60° can be construed as producing the illustrated rotation of diameter 116 through a 30° angle leading from the position of the maximum reach. Thereby, circular segment 102 is defined. In the illustrated embodiment of FIG. 2, segments 100 and 102 are each 120°; the long axis is the common chord, and the short axis (about 58% of the long axis and at right angles thereto) is the radius of each segment.

FIG. 3 illustrates graphically the phase relationships of waveforms in different parts of the circuit of FIG. 1 under conditions corresponding to an 85° internal fault, that is, along maximum reach lines 104 or 106 (the absolute amplitudes of the voltages have been disregarded in the formation of FIG. 3 in order to restrict the illustration to the pertinent phase and relative magnitude relationships). Sine wave 120 represents the voltage V (and V') derived at the taps of autotransformer windings 19 and 20; and sine wave 122 represents the system current lagging the system voltage by 85° under the conditions of a fault along the maximum reach angle. Sine wave 124 represents the outputs of transactor 24, which operates to shift the current-representative voltages by 85° leading, which under the condition of an 85° fault places IZ in phase with V. Sine wave 125 represents the phase relationship of voltage $IZ_2+V$ after the 60° lagging phase-shift produced by circuit 30. Spikes 126 and 126' are developed at the cross-over points of sine wave 125, which respectively lead by 30° the positive and negative maximums of the reference voltage V. Spike 126 is generated by generator 74 in circuit 70, and spike 126' by its counterpart in circuit 72.

Sine wave 128 represents $IZ_1-V$, and sine wave 130 represents $IZ_1-V$ shifted 60° leading (by phase shifter 54). Sine wave 128 corresponds to a condition of the absolute value of $IZ_1$ at any instant being greater than that value of V; it is this condition within certain phase relations that indicates a fault. Rectangular wave 132 represents the wave produced by square wave generator 78, which converts sine wave 128 to a rectangular wave, or voltage block, of a half cycle duration; block 132' represents the counterpart generated by circuit 72 during alternate half cycles. Rectangular block 134 similarly represents the block of a half cycle duration produced by generator 82; and block 134' the counterpart generated by circuit 72 during alternate half cycles.

The voltage blocks 136 (and 136') represent an equivalent waveform of the coincidence of waveforms 132 and 134 (and 132' and 134') in enabling gate 76 (and the respective counterpart gate in circuit 72). That is, gate 76 is enabled during the time period that waveforms 132 and 134 are coincident, as represented by block 136; and the corresponding gate of phase comparison circuit 72 is enabled during the time period represented by block 136', which is during the coincidence of voltage blocks 132' and 134'. Thus, the voltage block 136 provides the basis for phase comparison with spike 126, and the spike is passed if it occurs up to 60° to either side of the position shown in FIG. 3, which range represents the limiting conditions of the fault occurring within the characteristic quasi-elliptical characteristic 100, 102. If the fault is an external fault, spike 126 occurs out of coincidence (or out-of-phase) with block 136, and the spike output is blocked. Spike output 138 represents the output of enabled AND gate 76 under the conditions of enabling signals 132 and 134 being coincident with spike 126, which is generated during the positive half cycles of the system voltage. Spike 138' represents the output produced by phase-comparison circuit 72 during alternate half cycles corresponding to the negative half cycles of the system voltage; in practice, circuit 72 operates in the same fashion as circuit 70 and spikes 138' are likewise positive-going, so that the output of OR circuit 86 is a succession of spikes during respective successive half cycles under the conditions of an internal fault represented by the waveforms of diagram FIG. 3.

The phase-comparison circuit 70 in effect measures the out-of-phase angle B between vector $IZ_1-V$ and vector $IZ_2+V$, which determines whether the fault is within the relay characteristic 100, 102. That is, if angle B is 60° or less, there is coincidence between block 136 (blocks 132 and 134) and spike 126, and output spike 138 indicates the fault condition. The phase comparison of spike 126 with ($IZ_1-V$) block 132 may be considered as determining whether the fault condition lies within the area of the full circle of segment 100; and that comparison with the block 134 for $(IZ_1-V)\angle Q$ determines whether the fault lies within the area of the full circle of segment 102. The phase-shift P (60°) has the effect of rotating the diameter 114 by 30° lagging from the maximum reach (at the angle of 85° set by transactor 24) to establish the circle of segment 100; and phase-shift Q (60° leading) establishes the circle of segment 102 with its diameter 116 leading diameter 114 by 60° or leading the maximum reach by 30°. The comparison of spike 126 with the period of coincidence of both blocks 132 and 134 (or block 136) determines whether the fault lies within the area common to both circles, which is the quasi-elliptical region bounded by segments 100 and 102. The two 60° sections of block 136 to the left and right of the center point thereof may likewise be considered as respectively associated with segments 100 and 102. Thereby, the time occurrence of spike 126 is being compared at the same time with two offset mho characteristics, those of circles 100 and 102; in effect, two relay characteristics are being monitored simultaneously to achieve a dual-mho relay having a fast response.

Thus, phase-comparison circuit 70 functions as a means for determining whether the A-C operating vector quantities $IZ_1-V$ and $(IZ_1-V) \angle Q$ both have the same polarity as does reference vector quantity $(IZ_2+V) \angle P$ immediately after the zero crossover of the latter, which crossover initiates the generation of a spike. Effectively, circuit 70 compares the instantaneous magnitudes of $IZ_1$ and V, both unshifted and shifted, at the angle $(90°-P)$ in advance $IZ_2+V$ being a maximum, and produces an output control signal if the comparison reveals that $IZ_1$ at that instant has the same polarity and a greater magnitude than V, for both the shifted and unshifted $IZ_1-V$ quantities. This operation represented by the quasi-elliptical characteristic of FIG. 2 characterizes a mho relay with an offset reach of $Z_2$.

The offset reach is provided in the relay in order to develop an impedance characteristic that encompasses the substantial resistance accompanying arcing during a fault; that is, the resistance represented along the R axis extending from the terminal in FIG. 2. Where such offset reach is not desired in a particular application, the quasi-elliptical characteristic may nevertheless be provided without the backward reach $Z_2$ by using V alone as the polarizing voltage. Such a characteristic would locate the lower point of intersection of the two segments at the origin, and the relay would function as a directional dual-mho relay.

Whether the relay has an offset reach or not, it functions to develop intermittent switching periods from the operating voltages $(IZ_1-V)$ that are substantially less than half cycle periods (represented, for example, by the 120° blocks 136) and to compare the time relations of a certain instantaneous portion of the polarizing voltage (e. g. in a vector function of V, the angle 30° in advance of the maximum) with those intermittent periods. When that instantaneous portion of the vector function of V is detected within those intermittent periods, output signals are produced to indicate a fault condition.

Phase shifts P and Q may be interchanged to be leading and lagging respectively with respect to the common-chord. Thereby, P determines the direction of the diameter of the leading circle, and Q determines the direction of the diameter of the lagging circle relative to the other.

The relative amount of phase-shift P and Q produced by respective phase-shifters 30 and 54 may be chosen somewhat independently. The phase-shift P determines the location and radius of curvature of segment 100, while phase-shift Q determines the relative location of segment 102 and its radius of curvature. These two phase-shifts need not be the same in magnitude; for example, if phase-shift Q is set to be 70° leading, with P remaining as 60° lagging, diameter 114 is established at 30° lagging as shown in FIG. 2, while diameter 116 is reestablished at 40° leading the maximum reach of vector 104. Under those circumstances, circular segment 102 assumes a larger radius of curvature, though it intersects segment 100 at the same points defined by the common-chord vector 104, 106 (which is established by the transactor settings). Thus, the quasi-elliptical characteristic would be narrower than shown in FIG. 2 (due to the larger radius of curvature of segment 102) and non-symmetrical with respect to the common-chord. Similarly, if P is set to 50° lagging, and Q set to 70° leading, the diameter 114 is rotated 40° lagging from the common-chord, while diameter 116 is rotated 70° leading from diameter 114 and 30° leading from the common-chord to establish segment 102 in the same positions shown in FIG. 2. Segment 100 is in effect rotated somewhat to the right of its FIG. 2 position since it has a larger radius of curvature and presents a somewhat shallower curve. In this case the points of intersection of the segments 100 and 102 are again established at the same points indicated in FIG. 2 at the ends of the common-chord, and the characteristic has a non-symmetrical form that is the reverse of that for the aforementioned P and Q values of 60 and 70°, respectively.

Under such non-symmetrical conditions, the phase-shift value P determines the phase relation of spike 126 and the leading edge of block 132, and both phase values P and Q determine the phase relation of spike 126 and block 134. The relative phase-shift between blocks 132 and 134 determines the duration of block 136, which is 120°, where Q is 60°, and 110° where Q is 70°, etc. The relative location of the spike 126 with respect to block 136 for the 85° fault condition shown in FIG. 3 varies from the center point if the characteristic that is produced is nonsymmetrical; a symmetrical characteristic, for example, is established when Q leading is twice the supplement of P lagging. In FIG. 5, an unsymmetrical characteristic for $P=50°$ and $Q=60°$ is shown, which is otherwise the same as FIG. 2; corresponding but modified parts of FIG. 5 are referenced by the same numerals with the addition of a prime (') in association with new segment 100', and with a double-prime (") in association with new segment 102". In FIG. 5, the angle B, being measured by vectors 110' and 112' associated with segment 100' is 50° ($B_1=P$); and angle $B_2$ between vectors 110" and 112" associated with segment 102" is 70° ($B_2=180°-P-Q$). $B_1$ corresponds to the angle between spike 126 and the leading edge of gating block 136, and $B_2$ to the angle between spike 126 and the trailing edge of block 136.

The same characteristic of segments 100 and 102 may be established by different phase-shifts; for example, with operating voltages $(IZ_1-V) \angle -30°$ and $(IZ_1-V) \angle +30°$. Under such circumstances, two corresponding blocks 132 and 134 are established that have a resultant phase displacement of 60°, and the corresponding coincidence block 136 is established of 120° duration. Under those circumstances, to obtain a symmetrical characteristic of segments 100 and 102 as shown in FIG. 2, phase-shift P is 90° to establish spike 126 at the maximum point of the reference voltage, which corresponds to the center point of block 136 for an 85° internal fault. However, if desired, the relative phase or angle of the spike 126 may be varied, which would provide variations in the ultimate characteristic that is established.

As described above, the block 136 is derived from the coincidence of two blocks 132 and 134, which in turn are derived from two operating voltages proportional to $IZ_1-V$, with one having a relative phase-shift to the other. It is also possible to establish the block 136 from a single block, such as the block 132, by means of appropriate electronic circuits. For example, a multivibrator may be used that is triggered by the leading edge of block 132 to produce an output block 136 having its leading edge coincident with block 132 and having a duration of an appropriate angle as established by the reset timing circuit of the multivibrator. Thereby, a gating block of the same form and time relation as block 136 in FIG. 3 can be established with a one-shot (single-stable) multivibrator, with the leading edge of the gating block coincident with that of block 132 and having a duration of 120° as determined by the timing circuit of the one-shot multivibrator (this invention is not restricted to any particular form of pulse generating circuits, and suitable forms are well known in the art). The spike 126 is located relative to the gating block in the manner described above to achieve the characteristic shown in FIG. 2. If desired, by appropriate delay in the development of the leading edge of block 136, by control of variations in its duration, as well as by control of the phase-shift P which positions spike 126, non-symmetrical characteristics can also be established in this fashion.

The system of FIG. 1 using the phase-shifter 54 together with the AND circuit of FIG. 4 is a preferred form of the invention for the reason that the various relay circuits are continuously coupled to the line 11A and B, and the different signals developed at various parts of the relay are in direct response to the line voltages and currents. Thus, the entire relay operation is directly responsive to the line conditions and effective to detect a fault condition at high speed.

In FIG. 4 a preferred form of static circuit 70 is illustrated (which is related to a static circuit described in the aforementioned application S.N. 256,955) and which is suitable for combining the input signals thereto and performing a phase comparison based on the block-block-spike principle described above. The polarizing voltage $(IZ_2+V')\angle P$ at terminal 73B is supplied to the base of an NPN transistor 150 via current-limiting resistor 152, and its emitter is connected directly to the reference bus R at a negative direct voltage level, which may be the negative of a regulated direct voltage supply. The collector of transistor 150 is connected via a pair of load resistors 154 and 156 to the positive terminal $+v$ of a regulated direct voltage supply. The junction of resistors 154 and 156 is connected directly to the base of a PNP transistor 158, whose emitter is returned to an intermediate positive direct voltage level $+v_1$ of the supply, and whose collector is connected via a load resistor 160 to the reference bus R. An R–C differentiating circuit includes series capacitor 162 connected from the emitter of transistor 158 to a resistor 164 returned to the reference bus R. An isolating resistor 166 connects the junction 167 of the resistor and capacitor to a line 168, which in turn is connected via a diode 86A (which is part of OR circuit 86 of FIG. 1) to the output terminal 88.

For reasons which will become apparent, in this FIG. 4 circuit, the operating voltages at terminals 77B and 81B of transformer secondaries 45B and 53B, respectively, are used in contradistinction to the terminals 77A and 81A of FIG. 1, and an asterisk (*) hereinafter identifies the relatively inverted form of those voltages. The operating voltage $(IZ_1-V)^*$ at terminal 77B is supplied via a current-limiting resistor 170, to the base of an NPN transistor 172, whose base is returned to the positive voltage $+v$ via a bias resistor 174, whose emitter is returned to the reference bus R, and whose collector is connected directly to the output line 168. Similarly, the voltage $(IZ_1-V)^*\angle Q$ at terminal 81B is supplied, via a current-limiting resistor 176, to the base of a NPN transistor 178, whose base is returned to the positive voltage supply via a biasing resistor 180, whose emitter is returned to the reference bus R, and whose collector is connected directly to the output line 168.

In operation, the transistor 150 is biased on during positive half cycles of the input voltage and biased off during negative half cycles; the base-emitter bias threshold is but a small fraction of a volt and the input voltage is very much greater (e.g. 24 volts RMS), which results in transistor 150 being switched on as the input voltage passes through zero in a positive-going direction. When transistor 150 is biased off, transistor 158 is likewise biased off due to the reverse bias on the base-emitter junction thereof. When transistor 150 is turned on, a substantial current is drawn through the load resistors 154 and 156 to lower the voltage at the base of transistor 158, which biases the base-emitter junction in a forward direction; the collector-emitter current in transistor 150 includes emitter-base current in transistor 158, so that the latter is switched on and off substantially simultaneously with transistor 150. Thus, as the polarizing input voltage at terminal 73A crosses zero and becomes positive-going, transistors 150 and 158 both conduct fully and the collector voltage of transistor 158 rises sharply positive almost to $+v_1$. The positive-going step of voltage at the collector of transistor 158 is differentiated by the R–C combination 162 and 164 to develop a spike at terminal 167, which spike is passed by resistor 166 and appears on line 168 under certain conditions. The time-constant of the differentiating circuit is short to ensure a sharp voltage spike.

The base-emitter junctions of transistors 172 and 178 are biased in the forward direction during the positive half cycles of the inverted operating voltages at terminals 77B and 81B. Thus, during these half cycles the transistors 172 and 178 are fully conducting, and line 168 at their collectors is held closely to the negative reference voltage of the bus R. When the operating voltage at terminal 77B becomes positive-going from zero by a small fraction of a volt, the base-emitter junction of transistor 172 becomes reverse biased (due to the relatively large resistance ratio of the biasing resistor 174 to the current-limiting resistor 170), and transistor 172 is sharply driven to conduction. In a similar fashion, when the A-C inverted operating voltage at terminal 77B goes negative, transistor 172 is switched to cutoff. Transistor 178 is similarly switched on and off by the positive and negative half cycles, respectively, of the inverted voltage at terminal 81B.

When either transistor 172 or 178 is conducting, line 168 is effectively clamped to the negative reference voltage R, which inhibits the passage of a spike on line 168. However, when both transistors 172 and 178 are cut off, line 168 is freed and its voltage can follow any spike at terminal 167 generated by transistor 158 and R–C differentiating network. Thus, when both inverted operating voltages at terminals 77B and 81B are negative, transistors 172 and 178, functioning as an AND gate, enable the passage of a spike occurring at those times. These negative half cycles at terminals 77B and 81B correspond to positive half cycles at terminals 77A and 81A; the latter are the ones corresponding in phase to the polarizing voltage at terminal 73A, and which, indirectly, are being compared in phase by the circuit of FIG. 4. Thus, an output spike at terminal 88 indicates the detection of a fault condition as represented, for example, by the waveforms of FIG. 3. The use of the inverted-form operating voltages is called for in connection with the circuit requirements using the AND gate configuration of transistors 172 and 178.

In relating the circuit of FIG. 4 to the block diagram of circuit 70 in FIG. 1, the spike generator 74 includes switching transistors 150 and 158 and the R-C network 162, 164, with the spike 126 being generated at terminal 167. Square-wave generators 78 and 82 correspond respectively to the switching transistors 172 and 178. The gate-disabling portion of each of waveforms 132 and 134 corresponds respectively to the collector of the respective transistor being clamped to the bus R (and the gate-disabling portion of waveform 136 likewise corresponds to the collector of at least one transistor being so clamped) to inhibit the passage of a spike 126. The gate-enabling portions of the waveforms 132 and 134 correspond to the removal of the inhibiting clamp of the associated transistor.

The circuit of FIG. 4 may be used likewise for the static circuit 72 of FIG. 1, with the transformer terminals 73B, 77A and 81A as inputs. The diodes 86A, with their anodes connected to the common terminal 88, form OR circuit 86. A suitable form of circuit that may be used for pulse stretcher 90 is described in copending application S.N. 321,072, filed Nov. 4, 1963 (now Patent 3,317,745).

This invention is not restricted in its utility to relays having quasi-elliptical impedance characteristics. For example, the block-block-spike mechanism may be used to provide a relay having the "figure-8" characteristic formed by the broken line peripheries of circles 100 and 102 in FIG. 2. To provide such a characteristic, a modified static combining circuit is employed in place of circuit 70. That is, the spike from generator 74 is gated through one AND gate by block 132, and through another AND gate 134 by block 134. The outputs of the two AND gates are combined in OR circuit, and an output spike from the latter represents a fault condition within the area encompassed by one or the other, or both, of the two circles 100 and 102.

As explained above in connection with FIGS. 2 and 3, each relay circle is determined by the time relation of spike 126 and a corresponding one of the blocks 132 and 134; the dual-mho characteristic of a "figure-8" is likewise based on the time-comparison of spike 126 concurrently with the two blocks 132 and 134, but with these blocks related on a logical-OR basis to achieve the broken-line characteristic (the blocks 132 and 134 are related on a logical-AND basis to achieve the full line characteristic 100, 102). The two circles of the "figure-8" characteristic may have different radii of curvature and be non-symmetrical with respect to the common-chord, as explained above and as shown in FIG. 5.

To provide the "figure-8" characteristic, a single gating block, such as the block 136 of FIG. 3, may be used to gate the spike; such a single block is formed, for example, by combining blocks 132 and 134 on an OR basis and its length extends from the leading edge of block 134 to the trailing edge of block 132. Such a gating block is substantially greater than 180°, and equal to 240° in the example of FIG. 2 (as contrasted to substantially less than 180° for the block 136 that develops the quasi-elliptical characteristic, and equal to 120° in the example of FIG. 2). The angle B that is measured by the time relation of the spike and such a gating block is therefore greater than 90° (120° in the example of FIG. 2) for a "figure-8" characteristic. Different angles $B_1$ and $B_2$ are measured (for each of the two circles) where the characteristic is non-symmetrical, corresponding to spike 126 being located off-center relative to the single gating block under conditions representing a fault along the common-chord. Such a "figure-8" dual-mho characteristic can be rotated by a capacitive phase-shift of the IZ vectors, so that the common-chord extends, for example, into the second quadrant of the characteristic diagram, and the long axis of the resulting "figure-8" extends into the first quadrant. By appropriate choice of phase-shifts P and Q related to the angle of the common-chord, a symmetrical or non-symmetrical characteristic is formed of circles having appropriate reaches.

In similar fashions other non-circular shapes of relay characteristics may be developed based on the overlapping region of two or more circles or the region encompassed by the peripheries of two or more circles.

A preferred form of this invention has been shown and described by way of illustration, and it is apparent that various modifications will occur to those skilled in the art. It is contemplated, therefore, that the claims which conclude this specification will cover all such modifications as fall within the true spirit of this invention.

What is claimed is:

1. A distance relay responsive to the conditions of a fault on an alternating current power transmission line, comprising:
    (a) first means for coupling to the line and responsive to line voltages for developing reference voltages representative of the line voltages and having a certain phase relation thereto;
    (b) second means for coupling to a line and responsive to line currents for developing representative voltages related to the line currents by a predetermined constant impedance and by a predetermined phase displacement therefrom;
    (c) third means connected to said first and second means for developing operating voltages related to the vector combination of said impedance and reference voltages; and
    (d) fourth means for detecting, during intermittent periods of said operating voltages that are substantially different from half cycles of the line voltages, the time relations of a certain instantaneous portion of successive cycles of said reference voltages, and for producing output control signals indicative of fault conditions on the transmission line upon such detection.

2. A distance relay as set forth in claim 1 wherein said fourth means includes switching means having an effective operational period during said intermittent periods.

3. A distance relay as set forth in claim 2 wherein said fourth means includes additional switching means having an active period related to said certain reference voltage portion, and means for comparing the time relations of the active and operational periods of said switching means to produce said output signals.

4. A distance relay as set forth in claim 1 wherein:
    said third means includes means for developing a plurality of sets of said operating voltages having a predetermined relative phase displacement;
    and said fourth means includes a plurality of switching means respectively associated with said sets of operating voltages and having respective operational periods during alternate half cycles of the associated voltages, and means for connecting said switching means to produce combined operational periods of durations less than half cycles of the line voltages.

5. A distance relay as set forth in claim 4 wherein said fourth means includes an additional switching means having an active period related to said certain reference voltage portion, and means for comparing the time relations of the active and combined operational periods of said switching means to produce said output signals upon coincidence thereof.

6. A distance relay as recited in claim 5 wherein said third means further includes phase-shifting means for producing said operating voltage phase displacement.

7. A distance relay as recited in claim 5 wherein said means for developing sets of operating voltage sets includes means for developing one set of voltages proportional to the difference between said impedance and reference voltages and phase-shifting means for producing another set having said operating voltage displacement from said one set.

8. A distance relay as recited in claim 6 wherein said fourth means further includes means including a phase-shifting means for producing polarizing voltages having a certain phase displacement with respect to said reference voltages, and said additional switching means is responsive to a certain threshold level of said polarizing voltages to assume the active period thereof.

9. A distance relay as recited in claim 8 wherein said phase-shifting means of said third and fourth means are each adjustable for developing a range of phase displacements.

10. A distance relay as set forth in claim 8 wherein the intermittent periods of said operating voltages are substantially less than half cycles of the line voltages.

11. A distance relay as recited in claim 10 wherein said phase displacement of said operating voltages is about 60° between two of said voltage sets, and said phase displacement of said polarizing voltages is 60° lagging, and said polarizing voltage threshold is substantially the zero cross-over thereof.

12. A distance relay as recited in claim 10 wherein said means for producing polarizing voltages includes means for combining said impedance and reference voltages as a vector sum, whereby a relay characteristic having an offset reach is established.

13. A distance relay is recited in claim 10 wherein said second means includes a transactor having a primary for receiving line currents and a secondary for establishing said representative voltages.

14. A distance relay as recited in claim 13 wherein said predetermined phase displacement of said representative voltages produced by said transactor is approximately 85° leading.

15. A distance relay as set forth in claim 5 wherein said plurality of switching means includes a plurality of transistor means respectively responsive to said sets of operating voltages, said additional switching means includes another transistor means, and said time comparing means includes means for coupling said transistor means to a common output line.

16. A distance relay responsive to the conditions of a fault on an alternating current power transmission line, comprising:
 (a) first means for coupling to a line and responsive to line currents for developing representative voltages related to the line currents by a predetermined impedance;
 (b) second means for coupling to the line and responsive to line voltages for developing reference voltages representative of the line voltage;
 (c) third means connected to said first and second means for developing a plurality of sets of operating voltages respectively related to different vector combinations of said impedance and reference voltages; with the second and third being relatively phase displaced by a certain angle;
 (d) fourth means connected to said third means for developing different switching time periods in accordance with said sets of operating voltages;
 (e) fifth means connected to said second means for repeatedly producing voltage spikes in successive cycles of said reference voltage and as function thereof; and
 (f) sixth means connected to said fourth and fifth means for producing an output signal upon combinatorial relationships of said spikes and switching time periods indicative of fault conditions on the transmission line.

17. A distance relay as recited in claim 16 wherein said sixth means is operable to produce an output signal upon a coincidence relationship of said spikes and switching time periods.

18. A distance relay as recited in claim 17 wherein said third means develops sets of operating voltages each being proportional to the vector difference between said impedance and reference voltages, and with one set thereof being phase displaced from another; said fourth means develops switching time periods having differences in accordance with the phase displacement of said sets of operating voltages.

19. A distance relay responsive to the conditions of a fault on an alternating current power transmission line, comprising:
 (a) first electronic switching means including differentiating circuit means;
 (b) second and third electronic switching means;
 (c) means for coupling to a power line and for continuously responding to line voltages and line currents to supply (i) to said first switching means reference voltages that are a vector function of the line voltages and (ii) to said second and third switching means different operating voltages that are different vector functions of said line voltages and line currents; and
 (d) means for directly coupling said differentiating circuit means and said second and third electronic switching means to a common output terminal so as to generate output signals that are representative of fault conditions on said line, upon said three electronic switching means having a certain set of coincident operating conditions.

References Cited
UNITED STATES PATENTS

| | | | |
|---|---|---|---|
| RE. 23,430 | 6/1950 | Warrington | 317—36 |
| 3,303,390 | 2/1967 | Sonnemann | 317—36 |
| 3,312,865 | 4/1967 | Gambale | 317—36 |
| 3,277,345 | 10/1966 | Waldron | 317—36 |

FOREIGN PATENTS

| | | |
|---|---|---|
| 892,470 | 10/1953 | Germany. |

LEE T. HIX, *Primary Examiner.*

J. D. TRAMMELL, *Assistant Examiner.*